March 10, 1959 E. JUSTI 2,877,283

THERMOELECTRIC COUPLES, PARTICULARLY FOR THE PRODUCTION OF COLD, AND METHOD OF THEIR MANUFACTURE

Filed Aug. 24, 1956

United States Patent Office 2,877,283

Patented Mar. 10, 1959

2,877,283

THERMOELECTRIC COUPLES, PARTICULARLY FOR THE PRODUCTION OF COLD, AND METHOD OF THEIR MANUFACTURE

Eduard Justi, Braunschweig, Germany, assignor to Siemens-Schuckertwerke Aktiengesellschaft, Berlin-Siemensstadt and Erlangen, Germany, a corporation of Germany Application August 24, 1956, Serial No. 606,100

Claims priority, application Germany September 2, 1955

27 Claims. (Cl. 136—4)

My invention relates to thermoelectric couples and, in a more particular aspect, to thermocouples for the electric production of cold.

Altenkirch's theory of thermoelectric current generation and the inversely related electrothermic generation of heat or cold permits the determination of the optimum data or conditions for the production of cold, as regards maximum attainable economy and maximum attainable cooling. "Maximum attainable cooling," also called "critical cooling," means the amount of cooling at which the Peltier-cooling effect is just compensated by the influx of heat. The values of cooling heretofore obtained in practice are considerably lower than the critical value derivable from Altenkirch's theory and, generally, amount to about one-half of that value. This is one of the reasons why the production of cold by electrothermic means, so far, has failed to satisfy the desired requirements, in respect to effective cooling and efficiency obtainable therefrom.

It is an object of my invention to minimize this discrepancy between the theoretical optimum and the practically obtainable values of efficiency and thermoelectric reduction in temperature. Another, more specific object is to provide thermoelectric couples for the production of cold that, as regards effective cooling, closely approach the theoretical optimum according to Altenkirch.

To this end, and in accordance with a feature of my invention, I join the two thermoelectric members of a thermocouple by depositing upon at least one of them a soldering substance with a non-oxidizing atmosphere under application of ultrasonic pressure oscillation. Used as a non-oxidizing atmosphere may be a neutral atmosphere, for instance carbon dioxide, nitrogen, helium or argon, or instead a reducing atmosphere such as hydrogen or a hydrogen-containing atmosphere.

Formerly, the above-mentioned discrepancy of the experimentally obtained cooling effect from the theoretically expectable critical value has been explained as being due to the simplifying premises of Altenkirch's theory. However, according to more recent recognition, upon which the present invention is predicated, the main reason for the discrepancy lies in the fact that the Peltier cooling effect, which is generated in the cold junction and is proportional to the current intensity I, is reduced not only by the evolving Joule's heat $I_2.(R'+R'')$ generated in the respective resistances R' and R'' of the two thermoelectric members, but is further reduced by the Joule's heat $I^2.R_K$ generated within the contact resistance $R_K$ of the two members at their cool junction. Based upon this recognition, the theoretical value of the ratio of the actually obtainable cooling ($\Delta T'_{kr}$) to the theoretically possible cooling ($\Delta T_{kr}$) can be calculated as:

$$\Delta T'_{kr}/\Delta T_{kr}=1/(1+2\beta)$$

wherein $\beta=R_K/(R'+R'')$.

It follows from this equation that only 33% of the critical cooling is attained if the resistance of the cool junction is equal to the spreading resistance of the two members. If $R_K$ is reduced to 10% of the latter resistance, then the attainable cooling is still only 80% of the ideal value.

The method according to my invention affords reducing the contact resistance of the cool junction to below 5% and to thereby achieve more than 90% of the critical cooling.

In other fields of application it was known to apply a soldering technique according to which the solder is subjected to ultrasonics with the effect of reducing the contact resistance. These known methods however, do not meet the above-mentioned requirements of my invention, with respect to thermoelements. Electrolytic coatings of nobler metals on the locations of the couple members to be contacted by the solder are not satisfactory because oxide formation beneath the electrolytic coating cannot be completely prevented despite all precautionary expediences. This also applies to the known reducing solders. These are particularly unsuitable if they form an alloy with the thermoelectric components and the resulting alloys possess thermoelectric properties inferior to those of the components.

As mentioned, according to the invention the soldering substance is brought upon the thermoelectric components within a non-oxidizing atmosphere while under the effect of ultrasonic pressure oscillation. The thermoelectric component thus coated with the solder is thereafter joined by soldering with the other component or components of the thermoelement in the usual manner. While neutral gaseous atmospheres, such as carbon dioxide, nitrogen, helium or argon, have been found satisfactory, still better results have been obtained with reducing atmospheres, particularly hydrogen or hydrogen-containing atmospheres. The surface areas of the thermoelectric components to be soldered are first mechanically cleaned and are thereafter coated with the solder within one of the mentioned atmospheres under simultaneous application of ultrasonic oscillations. The ultrasonic processing is preferably effected within a continuous flow of the gaseous atmosphere.

Aside from the known tin solders, low-melting indium alloys, pure indium, or also pure bismuth, have been found to be favorably applicable.

The method according to the invention is particularly advantageous for the manufacture of a thermoelement, known in principle, in which an electrically good conductor, for instance a copper sheet, is soldered to and between the thermoelectric components to be joined (U. S. Patent 2,685,608). While originally this design had the purpose of improving the transmission of cold, it affords the further advantage, in combination with the present invention, of using respectively different soldering substances on the two thermoelectric components to be joined together. As a result, a better adaptation of the soldering substance to the physico-chemical properties of the two thermoelectric components, for instance their respective melting points, can be effected.

After the junction areas of the thermoelectric components are coated with solderable substance in accordance with the above-described method, the soldering proper can be carried out in the usual manner and within any desired atmosphere.

The method according to the invention is particularly significant and favorable if one or both of the thermoelectric components, as has been previously proposed (German Patent 872,210), are made of electrically semiconducting materials, particularly extrinsic lattice-defect semiconductors which, if desired, may be respectively different types of conductance (p-type and n-type). With such semiconducting components the known soldering methods result in relatively large contact resistances which are apt to obviate the particular advantage of these substances mainly their high differential thermoelectric force.

The invention will be further understood from the following description of examples with reference to the drawing in which—

Figure 1:
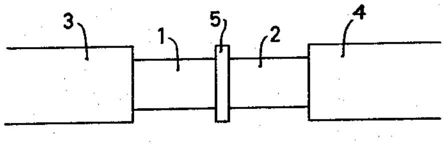
Fig. 1 shows schematically a thermocouple according to the invention.

The thermoelectric device illustrated in Fig. 1 may form one unit of a cold producing apparatus and comprises two thermoelectric members 1 and 2 joined with respective current-supply electrodes 3 and 4. Disposed between the two members 1 and 2 is a good-heat conductive intermediate member 5 which, like the electrodes 3 and 4, preferably consists of copper. The two members 1 and 2 may consist of any suitable materials of respectively different thermoelectric behavior. For instance, one of the components consists preferably of bismuth-telluride ($Bi_2Te_3$) and the other of bismuth (Bi).

The compound $Bi_2Te_3$ is a p-conductive semiconductor. The element Bi may be looked upon as a marginal semiconductor and has n-type conductance.

The thermoelectric components 1 and 2 are area-joined with respective current supply electrodes 3 and 4 by soldering, and are similarly joined with the intermediate copper member 5. The solder joints consist of indium or any of the other above-mentioned solder materials.

Figure 2:
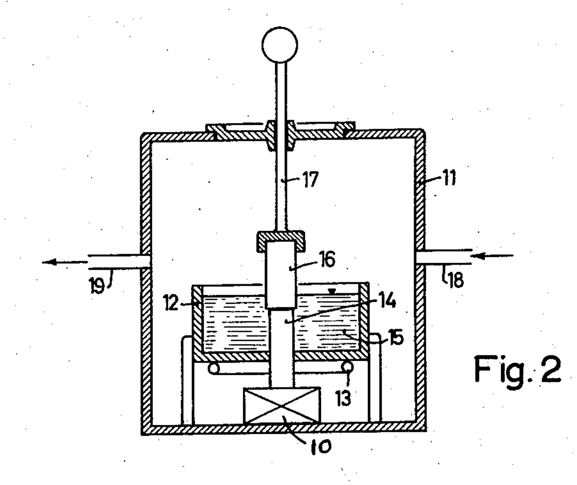
Fig. 2 shows schematically and in section an apparatus for performing the method according to the invention.

Before soldering the various parts of the device together, the thermoelectric members are first processed in accordance with the above-described method which can be conveniently carried out with the aid of apparatus as illustrated in Fig. 2 and described presently. The apparatus comprises a sealed vessel 11 in which a crucible 12 is electrically heated by a heating resistor 13. An ultrasonic oscillator rod 14 protrudes from below into the crucible and is excited by an ultrasonic excitation system schematically indicated at 10. The solder substance 15 in crucible 12 is melted when the apparatus is in operation. The thermoelectric member 16 to be coated with solder substance is mounted on a holder 17 which is vertically displaceable relative to the vessel 11. The process is preferably carried out in a non-oxidizing gas which is continuously passed through the vessel. For this purpose, the gas inlet pipe 18 and a gas outlet pipe 19 are provided.

Before describing the use of the apparatus for the manufacture of a thermocouple as shown in Fig. 1 and described above, it may be mentioned that a body of bismuth can be soldered but that $Bi_2Te_3$ is not solderable.

For processing the $Bi_2Te_3$ body 16, this body is first secured to the holder 17 with the holder in raised position. Then the solder substance 15 in crucible 12 is melted by means of the electric heater 13, and a continuous flow of non-oxidizing gas is passed through the vessel. Under these operating conditions, the body 16 is partially immersed in the melt 15 as shown, and is subjected to ultrasonic pressure oscillations by excitation of the oscillator 10, 14. Within a few seconds of such treatment, the immersed portion of member 16 is provided with a firmly adhering coating of bismuth. The ultrasonic frequency may amount to about 20 kilocycles per second. The processing temperature is so chosen that it is slightly above the melting point of the bismuth. A temperature of 300° C. is suitable, as compared with the bismuth melting temperature of 271° C. The particular design of the ultrasonic oscillator is irrelevant; any of the types of such oscillators available in commerce are applicable.

The process must be carried out at both ends of the $Bi_2Te_3$ member 16. Thereafter, the member 16 is removed and is soldered together with the other parts of the thermoelectric device. That is, the two coated ends of the $Bi_2Te_3$ body are soldered to the current-supply electrode and the intermediate copper plate respectively, and the Bi member is similarly soldered to its current-supply electrode and the intermediate member. The soldering is effected with an indium solder or any other of the above-mentioned solder substances having a melting point considerably below that of bismuth. The soldering can be carried out in any desired atmosphere.

A thermoelectric device designed and manufactured as described above with reference to Figs. 1 and 2 has been found to produce temperature differences up to 40° C. The necessary electric current intensities are dependent upon the geometric dimensions, namely the cross section and length, of the thermoelectric members. In general, with a diameter of some $10^{-1}$ cm.$^2$ and a length of the thermoelectric members of about 1 cm., these current intensities are in the order of magnitude of a few amperes.

As mentioned, the above-described method of the invention is analogously applicable to various other thermocouple combinations. For example, a thermocouple design as shown in Fig. 1 may be composed of two extrinsic semiconductor compounds, such as a member of SbBi and another member of SbCd with an intermediate plate member of Cu as known from U. S. Patent No. 2,685,608. The SbBi member, according to the present invention, is coated with Bi at the junction area, and the SbCd member is coated with Cd at the junction area in the manner set forth above. Thereafter, the Bi-coating of the SbBi member is soldered to the copper member by an indium-tin alloy, preferably a eutectic alloy with 51% In and 49% Sn; and the SbCd member is soldered to the copper member by means of a higher-melting solder such as tin-cadmium alloy with a preponderant amount of tin.

In the same manner, the method can be applied, for instance, to the known thermocouple combination of a first thermoelectric member composed of 1% Bi and 99% Te, and a second member composed of 52% Bi and 48% Te. In this case, both members may first be coated at their respective junction areas with bismuth, and the subsequent soldering may be effected with indium-tin alloy.

It will be understood, therefore, that my invention permits of various modifications as regards the substances of the individual components and hence may be embodied in the manufacture and composition of thermocouples other than specifically set forth herein, without departing from the essence of my invention and within the scope of the claims annexed hereto.

I claim:

1. The method of manufacturing a thermocouple having two thermoelectric members and a solder junction, which comprises coating said members at their respective junction areas within a non-oxidizing atmosphere with metallic solder substance and simultaneously applying ultrasonic oscillation thereto to form a junction of reduced contact resistance, and thereafter electrically joining the couple members together by soldering them at the coated areas.

2. The method of manufacturing a thermocouple having two thermoelectric members and a solder junction, which comprises melting a solder substance within a non-oxidizing atmosphere, partially immersing said individual members in the melt of said substance and simultaneously applying ultrasonic oscillation thereto until a solder coating is deposited on said respective members, to form a junction of reduced contact resistance, and thereafter electrically joining the couple members together by soldering them at the coated areas.

3. The method of manufacturing a thermocouple having two thermoelectric members and a solder junction, at least one of which thermoelectric members is an extrinsic semiconductor, which comprises placing said members into a reducing atmosphere and locally depositing on said members within said atmosphere a coating of molten soldering substance and simultaneously applying ultrasonic oscillation thereto, to form a junction of reduced contact resistance, and thereafter electrically connecting the couple members by soldering them at the coated areas to form said junction.

4. The method of manufacturing a thermocouple having two thermoelectric members and a solder junction, which comprises placing said members individually into a vessel, continuously passing through the vessel a flow of non-oxidizing gas, locally coating said members in said vessel with molten metal while simultaneously applying ultrasonic oscillation thereto, to minimize contact resistance, and thereafter electrically connecting the couple members together by soldering them at the coated areas.

5. The method of manufacturing a thermocouple having two thermoelectric members and a solder junction at least one of which thermoelectric members is an extrinsic semiconductor, which comprises coating said members at their respective junction areas within a non-oxidizing atmosphere with a soldering substance and simultaneously applying ultrasonic oscillation thereto, and thereafter soldering two thermoelectrically dissimilar ones of said solder-coated members to an intermediate good-conducting member at opposite sides respectively of said intermediate member, to form a junction of minimized contact resistance.

6. In the method according to claim 5, the steps of soldering said two thermoelectric members to said intermediate conductor member by respectively different solder metals each adapted to the one thermoelectric member to be soldered thereby.

7. The method of manufacturing a cold-producing thermocouple having two thermoelectric couple members of which at least one is an extrinsic semiconductor, which comprises depositing upon said semiconductor member within a non-oxidizing atmosphere a coating of solder metal and simultaneously applying ultrasonic oscillation thereto, and thereafter electrically connecting said semiconductor member with the other member by soldering said coating to form a junction of minimized contact resistance.

8. The method of manufacturing a thermocouple having two thermoelectric members and a solder junction, which comprises coating a thermoelectric member of bismuth-tellurium compound within a non-oxidizing atmosphere with a layer of bismuth and simultaneously applying ultrasonic pressure oscillations, and thereafter electrically connecting said member at the bismuth coating with the other member of the couple by soldering.

9. The method of manufacturing a thermocouple for the production of cold having two thermoelectric members consisting of respective semiconductors of respectively different type of conductance, which comprises individually depositing upon each of said members within a non-oxidizing atmosphere a coating of solder metal and simultaneously applying ultrasonic oscillation thereto, and thereafter electrically connecting said two coated members together by soldering said respective coatings.

10. A thermocouple comprising two thermoelectrically different members of which at least one consists of an intermetallic semiconductor compound, said semiconductor member having on its junction area a firmly adhering coating of solderable metallic substance comprising an element of said compound, and a solder junction joined to said coated junction area and electrically connected with the other member of the couple and consisting of soldering metal.

11. A thermocouple comprising two thermoelectrically different members, one of said members consisting of bismuth-tellurium compound $Bi_2Te_3$, said compound member having on its junction area a firmly adhering coating of bismuth, and a solder junction electrically connecting said coated junction area with the other member of the couple.

12. A thermocouple comprising two thermoelectrically different members consisting of extrinsic semiconductors of different conductance type respectively, at least one of said one member, and a solder junction electrically area a firmly adhering coating of solderable metallic substance comprising a component of the semiconductor of said one member, and a solder junction electrially connecting said coated junction area with the other member of the couple and consisting of metal other than said substance.

13. The method of manufacturing a thermocouple having two thermoelectric members, at least one of which is a semiconductor, and a solder junction, which comprises placing said members individually into a vessel, continuously passing through the vessel a flow of hydrogen gas, locally coating said members in said vessel with molten metal while simultaneously applying ultrasonic oscillation thereto, to diminish contact resistance, and thereafter electrically connecting the couple members together by soldering them at the coated areas.

14. The method of manufacturing a thermocouple having two thermoelectric members and a solder junction, at least one of the thermoelectric members being a bismuth-containing lattice-defect semiconductor, which comprises placing said members individually into a vessel, continuously passing through the vessel a flow of hydrogen gas, locally coating said members in said vessel with molten bismuth while simultaneously applying ultrasonic oscillation thereto, and thereafter electrically connecting the couple members together by soldering them at the coated areas.

15. In a method of manufacture of a cold-producing thermoelectric element, said element comprising two circuit members of thermoelectrically complementary materials, said members being conductively joined at junction areas through an intermediate member having good heat conductivity and slight thermoelectric power, one of the said two circuit members comprising a bismuth-containing semiconductor and the other a cadmium-containing semiconductor, the steps of coating the junction area of the bismuth-containing semiconductor with a firm, adhering coating of bismuth, and coating the junction area of the cadmium-containing semiconductor with a firm adhering coating of cadmium, by immersing each junction area in a melt of bismuth, and of cadmium, respectively, and subjecting each junction area to ultrasonic pressure oscillations while so immersed, this being carried out in a zone through which a stream of non-oxidizing gas is passed, and soldering said coated junction areas to the intermediate member by means of a soldering agent comprising a member of the group consisting of tin, bismuth and indium.

16. In a method of manufacture of a cold-producing thermoelectric element, said element comprising two circuit members of thermoelectrically complementary materials, said members being conductively joined at junction surfaces through an intermediate member having good heat conductivity and slight thermoelectric power, one of the said two circuit members comprising a bismuth-containing semiconductor and the other a cadmium-containing semiconductor, the steps of coating a junction surface of the bismuth-containing semiconductor with a firm, adhering coating of bismuth and a junction surface of the cadmium-containing semiconductor with a firm adhering coating of cadmium, by immersing each junction surface in a melt of bismuth and of cadmium respectively, and subjecting each junction surface to ultrasonic pressure oscillations while so immersed, this being carried out in a zone through which a stream of hydrogen gas is passed, and soldering said coated junction surfaces to the intermediate member by means of a soldering agent comprising a member of the group consisting of tin, bismuth and indium.

17. In a method of manufacture of a cold-producing thermoelectric element, said element comprising two circuit members of thermoelectrically complementary materials, said members being conductively joined at junction surfaces through an intermediate member having good heat conductivity and slight thermoelectric power, one of the said two circuit members comprising bismuth-tellurium semiconductor compound $Bi_2Te_3$ and the other being bismuth, the steps of coating a junction surface of the bismuth-tellurium semiconductor with a firm, adhering coating of bismuth and a junction surface of the bismuth circuit member with a firm adhering coating of bismuth, by immersing each juncition surface in a melt of bismuth, respectively, and subjecting each junction surface to ultrasonic pressure oscillations while so immersed, this being carried out in a zone through which a stream of hydrogen gas is passed, and soldering said coated junction surfaces to the intermediate member by means of a soldering agent comprising a member of the group consisting of tin, bismuth and indium.

18. In a method of manufacture of a cold-producing thermoelectric element, said element comprising two circuit members of thermoelectrically complementary materials, said members being conductively joined at junction surfaces through an intermediate member having good heat conductivity and slight thermoelectric power, one of the said two circuit members comprising bismuth-tellurium semiconductor compound $Bi_2Te_3$, the steps of coating a junction surface of the bismuth-tellurium semiconductor with a firm, adhering coating of bismuth, by immersing the junction surface of said semiconductor in a melt of bismuth, and subjecting said junction surface to ultrasonic pressure oscillations while so immersed, this being carried out in a zone through which a stream of non-oxidizing gas is passed, and soldering said coated junction surface to the intermediate member by means of a soldering agent.

19. The process of claim 16 in which the soldering agent is indium.

20. The process of claim 18 in which the soldering agent is indium.

21. A thermocouple comprising two thermoelectrically different members, one of said members consisting of bismuth-tellurium compound $Bi_2Te_3$, said compound member having on its junction area a firmly adhering coating of bismuth, and a solder junction electrically connecting said coated junction area with the other member of the couple, the solder of said solder junction comprising a member of the group consisting of tin, bismuth, and indium.

22. A thermocouple comprising a current supply electrode and two thermoelectrically different members of which at least one is taken from the group consisting of bismuth alloys and bismuth intermetallic compounds, said one member having two junction surfaces carrying an adherent firm coating of bismuth, one bismuth coated junction surface being joined by solder connection to the current supply electrode and the other bismuth coated junction surface being electrically connected to the second thermoelectrically different member through another solder connection.

23. A thermocouple comprising two thermoelectrically different members, one of said members consisting of bismuth-tellurium compound $Bi_2Te_3$, said compound member having on its junction area a firmly adhering coating of bismuth, and a solder junction electrically connecting said coated junction area with the other member of the couple.

24. A thermocouple comprising a current supply electrode and two thermoelectrically different members of which at least one is taken from the group consisting of bismuth alloys and intermetallic compounds with tellurium, said one member having two junction surfaces carrying an adherent firm coating of bismuth, one bismuth coated junction surface being joined by solder connection to the current supply electrode and the other bismuth coated junction surface being electrically connected to the second thermoelectrically different member through another solder connection.

25. A thermocouple comprising a current supply electrode and two thermoelectrically different members of which at least one is taken from the group consisting of bismuth alloys and intermetallic compounds with antimony, said one member having two junction surfaces carrying an adherent firm coating of bismuth, one bismuth coated junction surface being joined by solder connection to the current supply electrode and the other bismuth coated junction surface being electrically connected to the second thermoelectrically different member through another solder connection.

26. The thermocouple defined in claim 10, the semiconductor compound being a lattice-defect semiconductor.

27. The thermocouple defined in claim 10, the two members being lattice-defect semiconductors of p- and n-types respectively.

References Cited in the file of this patent

UNITED STATES PATENTS

| | | |
|---|---|---|
| 2,685,608 | Justi | Aug. 3, 1954 |
| 2,758,146 | Lindenblad | Aug. 7, 1956 |
| 2,762,857 | Lindenblad | Sept. 11, 1956 |

FOREIGN PATENTS

| | | |
|---|---|---|
| 829,642 | Germany | Jan. 28, 1952 |
| 705,157 | Great Britain | Mar. 10, 1954 |
| 710,977 | Great Britain | June 23, 1954 |

OTHER REFERENCES

The Welding Engineer, February 1951, pages 17–19.